Feb. 23, 1954
R. J. PAGLIUSO
2,670,228
BALL SWIVEL, TRIPOD ASSEMBLY HEAD
Filed March 5, 1951
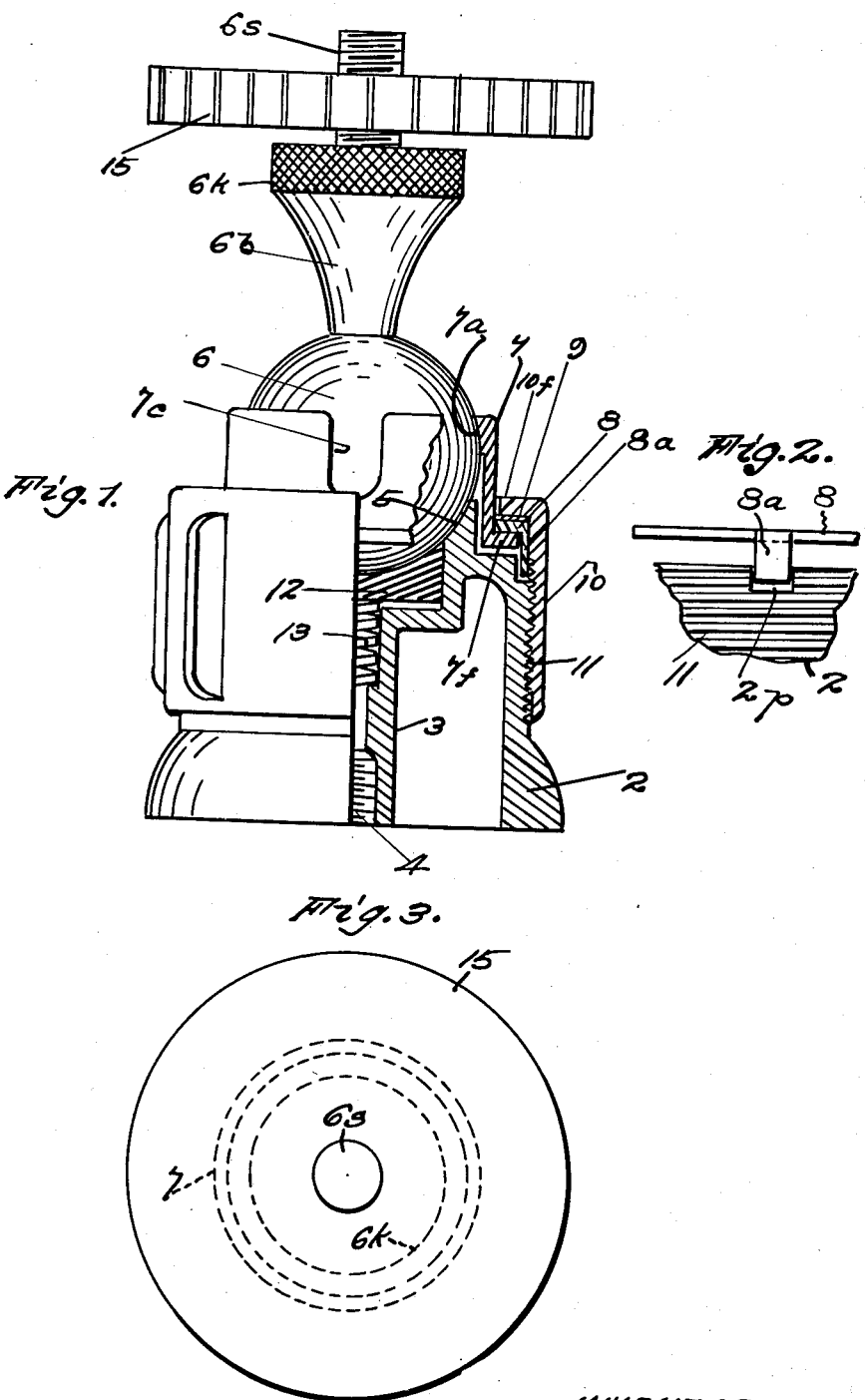
INVENTOR,
Robert J. Pagliuso;
By Frederick E. Maynard,
Atty.

Patented Feb. 23, 1954

2,670,228

UNITED STATES PATENT OFFICE 2,670,228

BALL SWIVEL, TRIPOD ASSEMBLY HEAD

Robert J. Pagliuso, La Canada, Calif.

Application March 5, 1951, Serial No. 213,975

3 Claims. (Cl. 287—87)

This invention is a tripod head assembly characterized by a tilting, swivel camera screw and other features.

Heretofore camera tripod heads have included a body on which there was a table-like member having a rigid screw onto which a camera was removably screwed and, generally, a radial set screw formed a device to fix the camera in a given lens-axis position on the tripod. The disadvantage of the said set screw was that it could take any of a great number of sometimed awkward positions around the head of the tripod. With that in view an object is, by the instant invention to provide a camera screw which can be both tilted at will in any direction above the tripod head and at the same time be rotatively swivelled on its own axis. And in this connection, the invention has the purpose of providing means for instantly clamping the camera screw in any of its possible positions, rotational and/or tilted, and which means incorporates a rotative clutch collar frictionally engaging a part of the camera screw and purposed to wholly eliminate the aforementioned set screw.

Also, an achieved intent of the invention is to provide a rotative control or locking clamp or finger-sleeve for quick set or quick release of the said collar, and, as to this feature, there is provided an anti-turning lock interposed between the effective clutch collar and its finger rotated sleeve so that rotating torque cannot be transferred to the collar, after the camera screw has been selectively adjusted, while the said sleeve is being turned either to set or to release the collar.

The invention further provides a main body having a seat feature in which a ball part of the camera screw is operatively mounted without other than tilting and/or rotational capacity. As to this characteristic there is provided means whereby to automatically control the camera screw at such times that the clutch collar frees the said screw to allow its selective adjustment.

The invention resides in certain advancements in the tripod art as set forth in the ensuing disclosure and having, with the above, additional objects and advantages as hereinafter developed, and whose constructions, combinations and details of means and manner of operation will be made manifest in the following description of the herewith illustrative embodiment; it being understood that modifications, variations, adaptations and equivalents may be resorted to within the scope, spirit and principles of the invention as it is claimed in conclusion hereof.

Figure 1 is an elevation, in partial, axial section of the head. Figure 2 is a sectional detail of the anti-rotation, clutch control. Figure 3 is a top plan of the head.

As here embodied the head includes a preferably die-cast, hollow body 2 of generally cylindrical form and having a central, tubular hub 3 whose lower end is internally threaded at 4 to receive a complementary screw (not shown) of a tripod to which the head is affixable.

The top end of the body 2 is provided with a coaxial, spherically concave seat 5 complementary to ball part 6 from which upwardly extends a knob 6b having a peripheral knurl 6k wherewithal to facilitate rocking and/or rotating the ball on its said seat 5. Projecting coaxially from and integral with the knob is a camera receiving screw 6s. By merely rotating the knob and its seated ball 6 the given camera can be attached to the instant head with no need of rotating, inconveniently, a hand-held camera.

Means for clamping the screw ball 6 onto its seat 5 here embodies a collar 7 having a friction of clutch seat 7a fitting the ball 6 around a zone above the center of the ball and the collar is provided with an outturned, bottom end flange 7f on the upper face of which lies a suitable locking washer 8 having one or more pendent lugs 8a taking into respective outside pockets 2p, Fig. 2, in the upper, outer corner of the body 2, so that the washer cannot rotate on the body. Resting on the washer 8 is a thrust ring 9 which is engaged by an inturned pressure flange 10f of pressure generating or locking sleeve 10 which is threaded at 11 on the exterior of the body 2. It will be seen from the above that by turning the sleeve 10 in one direction the pressure flange will force the washer downward and pull the clutch collar 7 firmly down on the ball 6 and bind it on the body seat 5 and therefore lock the camera screw 6s at any position of adjustment. If the clutch operating sleeve is rotated in the reverse direction then the ball is left free to rock or to rotate; but in either direction of sleeve rotation no turning torque from the sleeve is transmitted to the ball and its screw 6s because of the interposed locked washer 8.

Means are provided for preventing undesired play of the ball on its seat 5 while the pressure sleeve is in ball releasing position. There is here shown a yieldable cushion device including a presser shoe 12 suitably fitted in the body 2 and normally pressing up against the adjacent bottom surface of the swivel ball 6. For long life and reliability a spring 13 mounted in the body 2 reacts on the shoe with enough pressure to stabilize the ball when pressure of the clutch sleeve is reduced to permit the ball and its screw to tip and to rotate, or either separately.

The upper end of the clutch collar 7 is provided with a rim crotch 7c into which the nearby portion of the knob 6b may be tipped to an angle of about 90 degrees from the axis of the body 2. And the camera screw 6s has threaded thereon a camera locking, wheel-nut 15.

It is a feature of the invention that the clutch collar, the body 2, the clamp sleeve and the swivelled camera screw are all advantageously of die-cast embodiment.

What is claimed is:

1. A ball and socket assembly including a ball, a body in which the ball is rotatively and tiltably seated, a collar clutching the ball to its body seat, a finger sleeve screwed onto said body, and a member interlocked to the body against rotation and operatively engaging said collar and being turnably engaged by said sleeve so that the collar can be clamped by the sleeve onto the ball without rotative effect by the sleeve.

2. The assembly of claim 1; said collar and said sleeve having opposite flanges between which said member is interposed.

3. The assembly of claim 2; said member comprising a washer having a lug lodged in a respective notch in said body.

ROBERT J. PAGLIUSO.

References Cited in the file of this patent

UNITED STATES PATENTS

| Number | Name | Date |
|---|---|---|
| 135,771 | Burtch | Feb. 11, 1873 |
| 269,708 | Read | Dec. 26, 1882 |
| 1,780,383 | Green | Nov. 4, 1930 |
| 2,084,439 | Silberstein | Aug. 10, 1937 |
| 2,180,214 | Rapp | Nov. 14, 1939 |
| 2,332,504 | Brenner | Oct. 26, 1943 |
| 2,464,500 | Graham | Mar. 15, 1949 |
| 2,548,659 | Epprecht | Apr. 10, 1951 |

FOREIGN PATENTS

| Number | Country | Date |
|---|---|---|
| 125,909 | Sweden | of 1949 |
| 334,090 | Great Britain | of 1930 |
| 923,978 | France | of 1947 |